(12) United States Patent
Öhman

(10) Patent No.: US 6,334,927 B1
(45) Date of Patent: *Jan. 1, 2002

(54) METHOD AND APPARATUS FOR GLUING TOGETHER DISC ELEMENTS

(75) Inventor: Ove Öhman, Uppsala-Näs (SE)

(73) Assignee: OTB Group, B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/504,434

(22) Filed: Feb. 15, 2000

Related U.S. Application Data

(62) Division of application No. 09/137,237, filed on Aug. 20, 1998, now Pat. No. 6,042,684, which is a continuation of application No. PCT/SE97/00558, filed on Apr. 1, 1997.

(30) Foreign Application Priority Data

Apr. 1, 1996 (SE) ............................................. 9601263

(51) Int. Cl.$^7$ .......................... B29C 43/34; B32B 31/04
(52) U.S. Cl. ................... 156/275.5; 156/275.7; 156/295; 156/578
(58) Field of Search ........................... 156/275.5, 275.7, 156/285, 295, 578; 369/286; 428/65.2

(56) References Cited

FOREIGN PATENT DOCUMENTS

| EP | 0 243 517 | 11/1987 |
|---|---|---|
| JP | 61-190738 | 8/1986 |
| JP | 61-194662 | 8/1986 |
| JP | 1-253846 | 10/1989 |
| JP | 9-035335 | 2/1997 |
| WO | WO 87/02934 | 5/1987 |

*Primary Examiner*—Sam Chuan Yao
(74) *Attorney, Agent, or Firm*—Young & Thompson

(57) ABSTRACT

A method and a device for gluing together two disc elements. The two disc elements are brought together coaxially against each other to form a gap between the disc elements. In an inner area of the gap a liquid adhesive is applied so that it comes essentially simultaneously into contact with facing sides of the two disc elements. The two disc elements are then brought towards each other to achieve a uniform adhesive layer between the disc elements. The disc comprises lower and upper holders for respective disc elements and a unit for applying liquid adhesive in an inner area of the gap.

6 Claims, 2 Drawing Sheets

METHOD AND APPARATUS FOR GLUING TOGETHER DISC ELEMENTS

CROSS-REFERENCE TO RELATED APPLICATION

This application is a division of application Ser. No. 09/137,237, filed Aug. 20, 1998 now U.S. Pat. No. 6,042,684, which is a continuation of International application PCT/SE 97/00558 filed on Apr. 1, 1997.

FIELD OF THE INVENTION

The present invention relates to a method of glueing together two disc elements, especially substrates for digital audio, video or computer discs, such as digital video discs (DVDs).

BACKGROUND OF THE INVENTION

When manufacturing certain types of data storage discs, such as so-called DVDs, with one or more information layers, two substrate discs of polycarbonate of a thickness of 0.6 mm are normally glued together, with the information layer(s) adjacent to the adhesive layer joining the discs.

In one proposed method of glueing, the adhesive is applied to one of the discs by means of a printing process, for example screen printing, whereafter the discs are joined together. This method does not waste adhesive and the application can be done very rapidly. However, there is some risk of air enclosures when the discs are put together and some risk that the printing system will break down should the screen printing blanket rupture.

A method using double adhesive tape for joining the two disc elements has also been suggested, but this method causes air enclosures and provides a joint of unreliable strength and thermal stability. Nor can this method be used for DVDs of the type "SD9", i.e. where both of the discs elements have information layers and where these layers are to be read by laser light which must pass, with the correct defraction, through the joint layer between the disc elements.

SUMMARY OF THE INVENTION

One purpose of the present invention is to suggest a glueing method which prevents the occurrence of air enclosures in the adhesive layer between the discs.

For this purpose, the method according to the invention is characterized by the steps of:
 a) bringing the two disc elements together coaxially with each other in such a manner that a gap is left between the disc elements;
 b) applying, in an inner area of the gap, a liquid adhesive in such manner that the adhesive will essentially come into contact simultaneously with facing sides of the two disc elements, and
 c) bringing the disc elements towards each other to achieve a well defined uniform filling out of adhesive between the disc elements.

It has been found that a simultaneous or essentially simultaneous wetting of the opposing gap surfaces with an easily flowing adhesive with good capillary filling properties is an essential precondition in order for the applied adhesive to flow out and be evenly distributed over the entire surface between the outer and inner peripheral limiting edges of the disc elements without forming air enclosures, since the disc elements are brought towards each other with only the aid of gravity and "are sucked together" by the capillary forces of the adhesive. In this way a very uniform, homogeneous adhesive layer without air enclosures can be obtained without forceably pressing the discs together.

The disc elements can be kept plane-parallel to each other during the application of adhesive, or they can be held relative to each other in such a way during the application of adhesive that a radially outwardly diverging gap is formed between at least one radially outer section of the disc elements.

The diverging gap can be obtained by curving one or both of the disc elements convexly from each other, preferably by creating a subatmospheric pressure on the side of the disc element facing away from the gap.

The adhesive is applied preferably by injection via a nozzle insertable into the gap during simultaneous rotation of the disc elements, whereupon a coherent annular adhesive string can be laid out in the gap between the disc elements.

After application of the adhesive string, the nozzle is retracted and the two disc elements are rotated individually in opposite directions, each at least half a rotation, preferably about one half to one rotation, so that any uneveness in the circumferential distribution of the adhesive string can be evened out by the disc elements producing a shearing effect in the adhesive. The result will be a homogeneous and uniform ring of adhesive, which is an essential precondition for even distribution over the entire disc surface of the adhesive in a subsequent step.

The present invention also relates to a device for glueing together disc elements of the above mentioned type, said device comprising a lower holder for carrying one disc element, an upper holder for carrying the other disc element in a coaxial relation to the lower disc element to form a gap between the disc elements, and a means for applying a liquid adhesive in an inner area of the gap.

In order to create a diverging gap to facilitate insertion of the adhesive application means between the disc elements, there is one holder that can have an essentially convex surface facing the disc element. This convex surface is intended to define, together with the disc element and sealing elements a space which can be subjected to vacuum. Alternatively, the holders can be disposed to hold the disc elements plane-parallel.

The means for applying adhesive can comprise a nozzle which is disposed to direct, either radially from outside or inside, a stream of adhesive into the gap in such a way that the stream of adhesive strikes facing surfaces of the disc elements essentially simultaneously. The nozzle can be insertable into and extractable from the gap so that its opening comes close to the facing gap surfaces in an inner portion of the gap.

In order to provide a continuous annular string of adhesive in the gap, the holders are rotatable.

For the case when only one of the holders is arranged to curve an associated disc element to create the adhesive introduction gap, it is suitable to make the lower holder with a planar disc-carrying surface.

BRIEF DESCRIPTION OF THE DRAWINGS

The invention will be described in more detail below with reference to the accompanying drawings, in which.

DETAILED DESCRIPTION OF THE INVENTION

Figure 1:
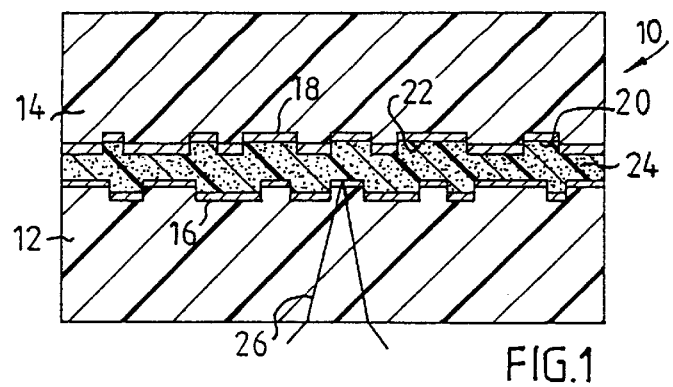
FIG. 1 shows a schematic cross-section of an enlarged section of a so-called DVD of "SD9" type to illustrate its construction.

FIG. 1 shows schematically a digital data storing disc of CD format, namely a so-called digital video disc 10 of the type called "SD9". Such a disc 10 comprises two disc substrates 12, 14, each having a thickness of 0.6 mm and a diameter of ca 120 mm and made of a transparent plastic material such as polycarbonate. Each disc substrate 12, 14 respectively has an information layer 16, 18 respectively on facing sides containing short 20 and long 22 depressions with a depth of about 0.1 μm. The information layer 16 on the lower disc substrate 12 is coated with a layer of for example Al, Au or SiN which is semi-reflecting for laser light, while the information layer 18 on the upper disc substrate 14 is made completely reflecting. The two disc substrates 12, 14 are joined together by means of a thin adhesive layer 24 (cirka 14–70 μm), the index of refraction of which should be complementary to the index of reflection of the substrates (polycarbonate) in order to avoid any refractive error when the laser light is to read the upper information layer 18. In FIG. 1, a light beam 26 is shown which is focused on the lower, semi-reflecting layer 16.

For DVDs 10 with double information layers, as shown in FIG. 1, it is of the greatest importance that the adhesive layer 24 be homogeneous and completely free of air enclosures in order to provide undisturbed focusing of the laser light on the information layer 18. This problem is, however, not critical in a single layer DVD ("SD5"), where the upper disc substrate can be a blank information free disc, i.e. where only a single lower completely reflecting layer is read.

Figure 2:
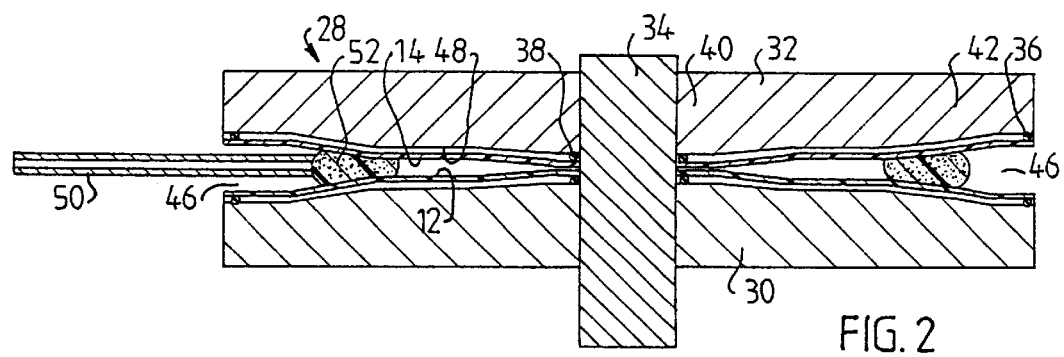
FIG. 2 shows a schematic cross-sectional view of a device according to the invention for glueing together DVDs substrates, where both disc substrates are curved to form an adhesive introduction gap.

FIG. 2 shows schematically a device 28 according to the invention for glueing together two disc substrates 12, 14. The device 28 comprises a lower substrate holder 30 and an upper substrate holder 32, which are rotatable about a central shaft 34. The holders 30, 32, which can be essentially identical, each have an outer and inner sealing ring 36 and 38 respectively and are formed with a thicker hub portion 40 and a thinner peripheral portion 42 in order to create between the holders 30, 32 a radially outwardly diverging space 44 (FIG. 3) in order to make it possible to hold the disc substrates 12, 14 in a convexly curved state for the application of adhesive, as shown in FIG. 2.

Figure 3:
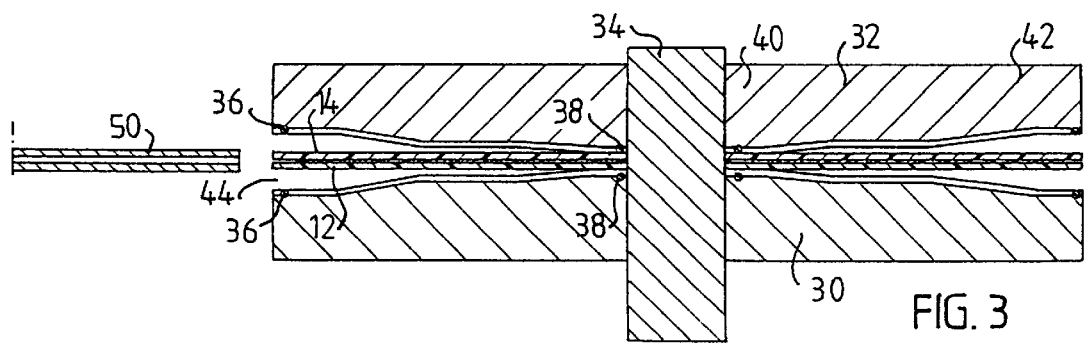
FIG. 3 shows the device in FIG. 2 in a step after injection of adhesive, when the disc elements are flattened out and the homogeneous layer of adhesive has been formed therebetween.

For the purpose of holding securely the respective disc elements 12, 14 in a convexly curved state to form an intermediate radially outwardly diverging gap 46 for the introduction of adhesive, each of the holders 30, 32 have a surface section between its outer and inner sealing rings 36, 38, forming therebetween and with a disc element a space 48 which is in communication with a vacuum source (not shown). After placing a disc substrate 12, 14 on each holder 30, 32 and connecting a vacuum source (not shown), the substrates can be made to curve to the shape shown in FIG. 2 or similar thereto, thus making it possible to insert an adhesive dispensing nozzle 50 into the outer broadest portion of the gap 46 in order to dispense a carefully measured amount of a flowable adhesive towards a narrow portion of the gap so that the adhesive essentially comes into contact simultaneously with the facing surfaces of the substrates. By rotating the two holders 30, 32 one rotation at the same time as adhesive is injected, an annular string of adhesive 52 is created around the substrate gap. After application of the adhesive string 52, the nozzle 50 is retracted from the gap 46. In order to eliminate any unevenness in the distribution of adhesive in the peripheral adhesive string, the two holders are also rotatable relative to each other, so that the adhesive string can be subjected to a shearing effect and thus be made more even before the disc substrates are brought together. The relative rotation is performed suitably by causing the two holders to rotate approximately one half to one complete rotation in opposite directions. The vacuum in the space 48 is then equalized so that the disc substrates 12, 14 are released from their respective holders and spring back to a normal flat state, as shown in FIG. 3, whereupon the adhesive in the string 52, due to the bringing together of the disc substrates and the capillary forces of the adhesive, will be distributed uniformly in the space between the disc substrates 12, 14. Any air present between the disc substrates will thus be expelled from the intermediate space, both radially inwards and radially outwards so that a thin even adhesive layer is formed which is free from air enclosures.

Figure 4:
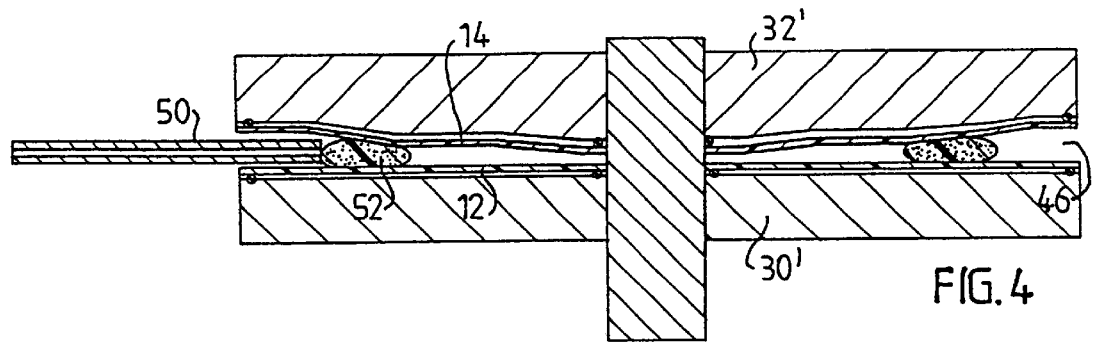
FIG. 4 shows an alternative embodiment of the device according to the invention, where only one holder curves its associated disc element to form an adhesive introduction gap.

FIG. 4 shows an alternative simplified embodiment of a disc glueing device according to the present invention, which differs from the device described above only in that the lower holder 30' is made flat and lacks means for bending the associated disc substrate. Instead, only the upper holder 32' is arranged to achieve an adhesive introduction gap 46 and for this purpose it must bend its associated disc substrate 14 somewhat more than in the embodiment according to FIGS. 2 and 3 to permit insertion of the adhesive application nozzle 50.

Figure 5:
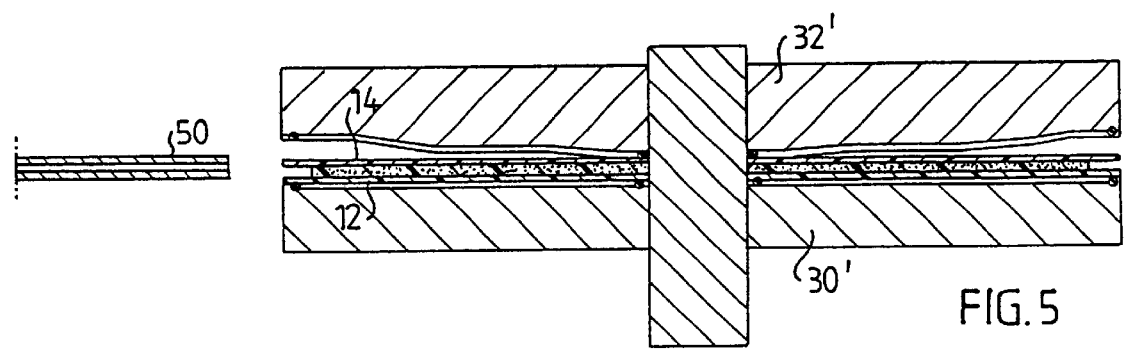
FIG. 5 shows the device in FIG. 4 when the disc elements have been joined together by gravity and the capillary forces of the adhesive.

FIG. 5 shows the disc elements 12, 14 in their flat state after adhesive application in the embodiment shown in FIG. 4, after the adhesive has spread out and filled the gap between the disc elements 12, 14 to the required extent.

Figure 6:
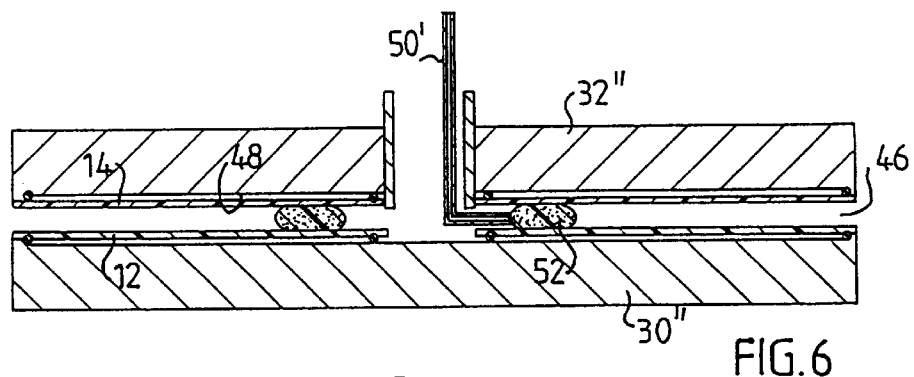
FIG. 6 shows an additional embodiment of the device according to the invention, where the disc elements are kept in separated plane-parallel relation during adhesive application, whereby the adhesive is introduced by means of an adhesive introduction nozzle insertable radially from within into the gap between the disc elements.

An additional conceivable embodiment of the device according to the invention is shown in FIG. 6, where the disc elements 12, 14 at glue application are kept essentially in a plane-parallel spaced state by a planar lower holder 30", and a planar upper holder 32". The adhesive is inserted into the gap 46 between the disc elements of means of an adhesive injection nozzle 50', which can be inserted into the gap radially from within. After application of a circular string 52 of adhesive by rotation of the holders 30", 32" one rotation during adhesive dispensing, the nozzle 50' is then retracted, and after a relative rotation of the holders for even spreading of the adhesive string the upper disc element 14 is released from its holder 32", as shown in FIG. 7, and the disc elements 12, 14 are brought together by the effect of gravity on the upper disc element and the effect of capillary forces in the adhesive, striving to pull the two disc elements 12, 14 towards each other as the adhesive spreads out and fills the space between the disc elements forming a uniform adhesive layer free from air enclosures.

Within the scope of the invention it is also conceivable to apply the adhesive by injecting it into the gap via one or more fixed nozzles, which do not need to be inserted into the gap. It would thus be sufficient to have such a fixed nozzle which ejects a well-defined stream of adhesive towards a preferably tapered portion of the gap 46, making contact at the same time with the two facing surfaces of the substrates.

Figure 7:
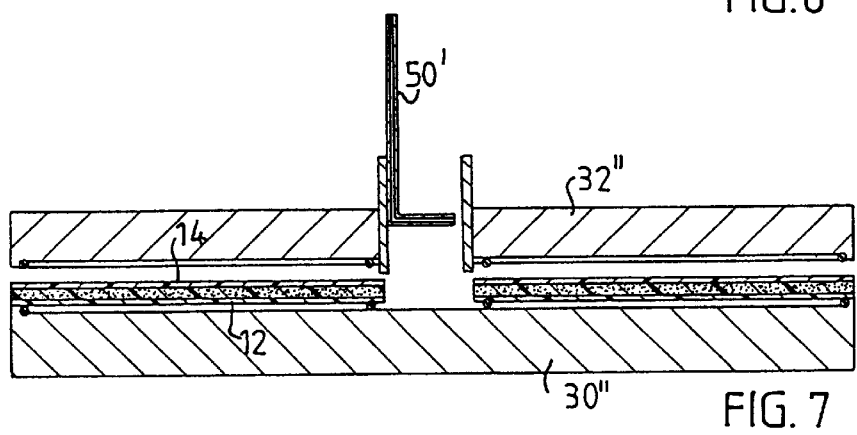
FIG. 7 shows the device in FIG. 6 in a step after the introduction of adhesive, when the upper disc element has been released from its holder after having been joined to the lower disc element to form a homogeneous adhesive layer between the disc elements.

It is also conceivable to make the device in such a manner that the disc elements form a radially inwardly diverging gap when an adhesive introduction nozzle of the type shown in FIGS. 6 and 7 is used.

It is also conceivable within the scope of the invention to make the substrate holders in such a manner that, after adhesive application, they also exert a pressure on the disc substrates 12, 14 to accelerate the filling out of the gap with adhesive.

What is claimed is:

1. Method of glueing together two disc elements, for digital audio, video or computer discs, which comprises the steps of:
   a) bringing the two disc elements together coaxially with each other in such a manner that a gap is left between the disc elements;
   b) applying in an inner area of the gap, while rotating the disc elements, a liquid adhesive in the shape of a ring in such manner that the adhesive will essentially come into contact simultaneously with facing sides of the two disc elements;
   c) rotating the disc elements relative to each other to even out the adhesive ring by shearing action; and
   d) bringing the disc elements towards each other to achieve a well-defined, uniform filling out of adhesive between the disc elements.

2. Method according to claim 1, wherein the disc elements are each rotated at least one half rotation in opposite directions.

3. Method according to claim 1, wherein the disc elements are each rotated between one half to one complete rotation in opposite directions.

4. Method according to claim 1, wherein at least one adhesive injection nozzle is inserted into the gap prior to the application of adhesive.

5. Method according to claim 4, wherein the nozzle is inserted into the gap radially from the outside.

6. Method according to claim 1, wherein the disc elements are kept in parallel relationship to each other during the application of adhesive.

* * * * *